United States Patent
Perez et al.

(10) Patent No.: US 8,452,264 B1
(45) Date of Patent: May 28, 2013

(54) PRESENTING MESSAGING PRIOR TO ANSWERING A CALL

(75) Inventors: Cesar Perez, Olathe, KS (US); Louis Eric Wingo, Liberty, MO (US); Sanjay K. Sharma, Olathe, KS (US); Kenneth Ray Steele, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 626 days.

(21) Appl. No.: 12/573,970

(22) Filed: Oct. 6, 2009

(51) Int. Cl.
*H04L 12/58* (2006.01)

(52) U.S. Cl.
USPC .......... 455/412.1; 455/404.1; 455/414.1; 455/406; 455/414.3; 455/414.4; 455/412.2

(58) Field of Classification Search
USPC .......... 455/404.1, 414.1, 406, 412.1, 414.4, 455/414.3, 412.2, 466
See application file for complete search history.

(56) References Cited

U.S. PATENT DOCUMENTS

| | | | | |
|---|---|---|---|---|
| 6,427,076 | B2 * | 7/2002 | Skog | 455/433 |
| 7,302,280 | B2 * | 11/2007 | Hinckley et al. | 455/567 |
| 2008/0186921 | A1 * | 8/2008 | Long et al. | 370/331 |
| 2009/0275307 | A1 * | 11/2009 | Kahn | 455/404.1 |
| 2010/0093315 | A1 * | 4/2010 | Grosch et al. | 455/412.2 |
| 2010/0197287 | A1 * | 8/2010 | Noldus et al. | 455/415 |

* cited by examiner

*Primary Examiner* — Kamran Afshar
*Assistant Examiner* — Khalid Shaheed

(57) ABSTRACT

Systems, products, and methods are disclosed for enabling a user to receive a message at the time of an incoming call. One embodiment of the method includes receiving a set of dialed digits from a calling device, recognizing a code in the dialed digits, and sending display information (based on the code) to a target device, which presents the display information before the call is answered.

17 Claims, 9 Drawing Sheets

US 8,452,264 B1

PRESENTING MESSAGING PRIOR TO ANSWERING A CALL

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways of presenting a message on a called device during a call cycle; that is, prior to the call being answered. Moreover, feedback can be received, and conveyed to the caller before the call is torn down.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| BTS | Base Transceiver Station/Base Station |
| CDMA | Code Division Multiple Access |
| GGSN | GPRS Gateway Support Node |
| GPRS | General Packet Radio Service |
| GSM | Global System for Mobile communications (Groupe Spécial Mobile) |
| IP | Internet Protocol |
| LED | Light Emitting Diode |
| NAI | Network Address Identifier |
| PDA | Personal Data Assistant |
| PSTN | Public Switched Telephone Network |
| TDMA | Time division multiple access |
| UMTS | Universal Mobile Telecommunications System |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
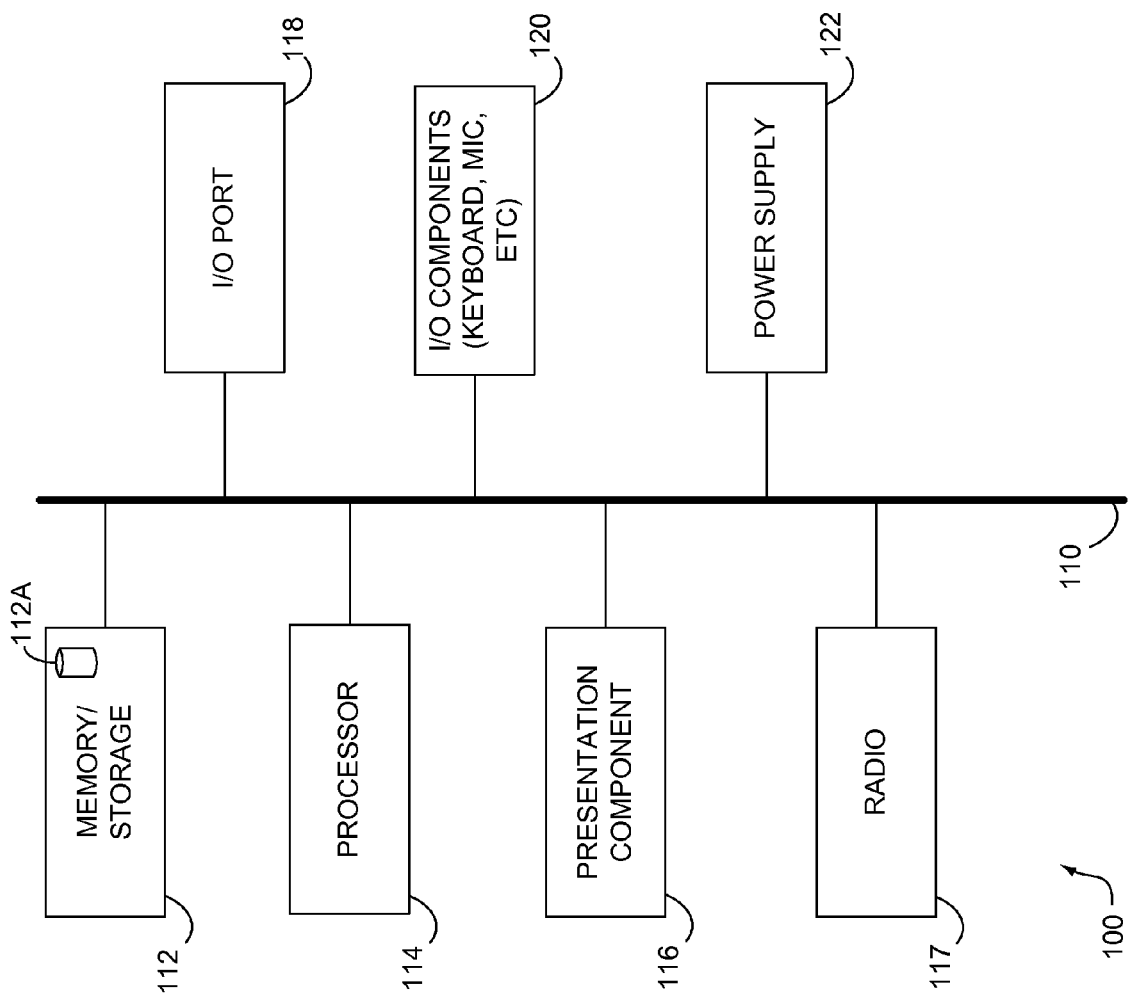
FIG. 1 depicts an illustrative device suitable for use in connection with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory component 112 can include any type of medium that is capable of storing information (e.g., a database 112A). A database can be any collection of records. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like (including what is known in the art as WiMax technology and also Long Term Evolution (LTE). In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
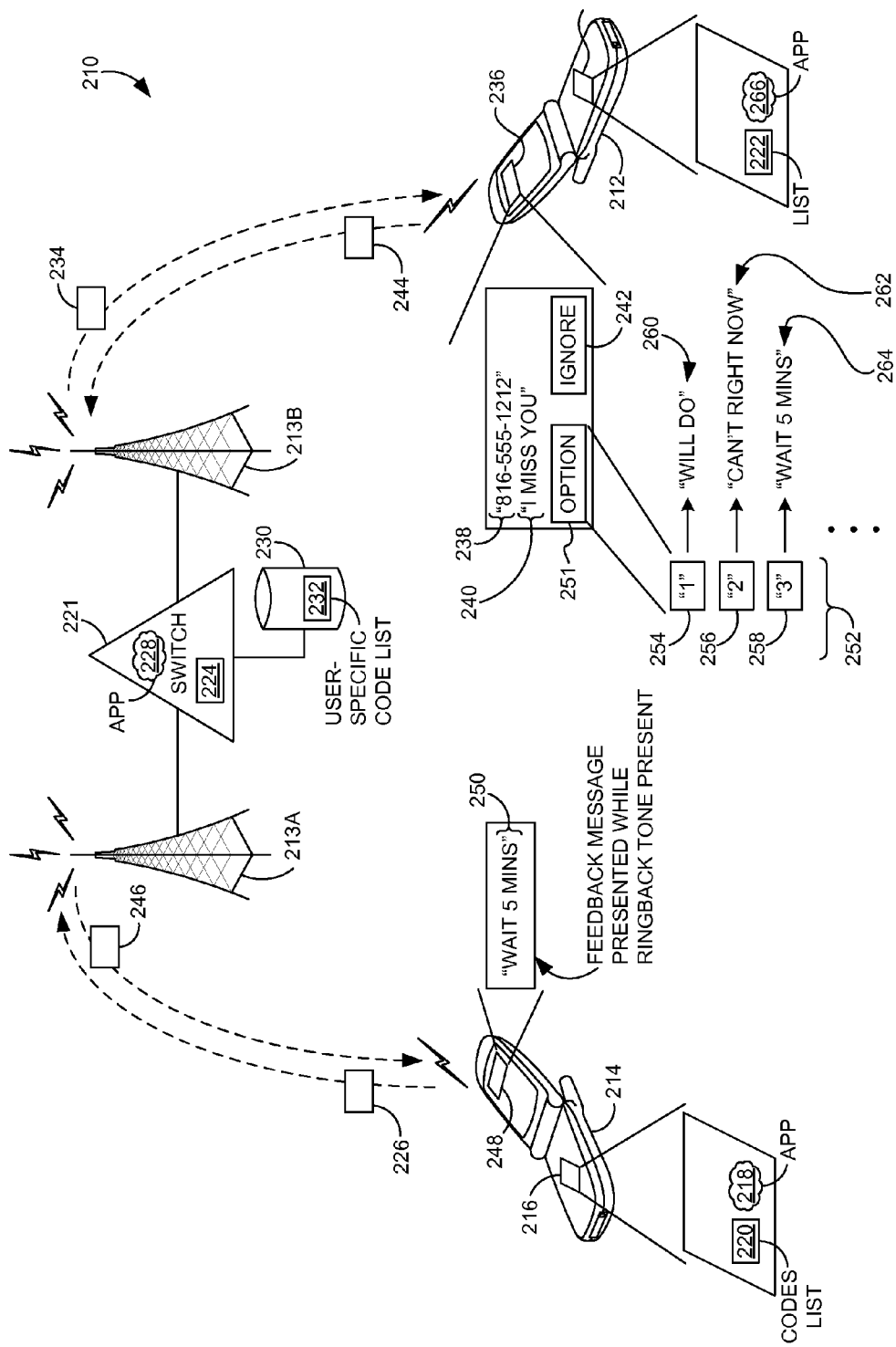
FIG. 2 depicts an illustrative operating environment suitable for practicing an embodiment of the present invention.

Turning now to FIG. 2, an illustrative operating environment is provided and referenced generally by the numeral 210. In one embodiment, the operating environment enables a target device 212 to receive a message at the time of an incoming call and before a call is established between the target device and a calling device 214. In this way, a user is able to be presented with a message at the same time his or her phone is ringing and before he or she answers the telephone. In another implementation, the message may only be displayed on the target device, if target device user chooses to ignore the call. Thus providing an efficient way for the calling party to leave short message to the target party without involving a voice mail or any additional system. As will be explained in greater detail, the recipient will also be afforded an opportunity to reply to the attempted call without actually answering the call, and such reply will be conveyed back to the calling device prior to the call being torn down.

In one embodiment, calling device 214 includes computer-readable media 216, which includes an application 218 as well as a codes list 220. Application 218 facilitates various functional aspects of the present invention. By way of example, application 218 receives information associated with communicating a desired text message that is to be displayed on receiving device 212. Sometimes, actual text is conveyed from calling device 214 that is to be displayed on receiving device 212. In other embodiments, codes list 220 offers the option of a user being able to enter a desired code, which can then be interpreted by calling device 214 itself, a telecommunications switch 221, or even a component on target device 212, such as a complimentary codes list 222. Codes might be along the lines of "01"=Please call me back; "02"=Waiting for you; "03"=Lets meet; "04"=Love you.

Although this will be explained in greater detail below, in brief, if a user desires to present a text message on receiving device 212, then embodiments of the present invention contemplate being able to enter the text directly, or being able to use one or more codes that are usable to present a desired text message on target device 212. As mentioned, in one embodiment, calling device 214 includes a codes list 220 that maps a set of codes to a set of custom or predefined text entries. In this way, a lookup can be performed on calling device 214 such that a corresponding text message is communicated from calling device 214. In other embodiments, the code itself is communicated from calling device 214 so that another device such as switch 221 or target device 212 can make use of the code. In some embodiments, switch 221 performs a lookup in its list 224 to determine an appropriate text message to send to target device 212. In still other embodiments, switch 221 merely passes a code along to target device 212, which then references its list 222 to determine a text message to be presented on its display.

Thus, in one embodiment, a set of dialed digits 226 is communicated from calling device 214. In some embodiments a paging channel, which is useable to communicate small amounts of data such as via SMS, can be leveraged. In other embodiments, the data is communicated through the same medium as is the normal set of dialed digits. These dialed digits 226 are received by switch 221. In one embodiment, the dialed digits include a phone number that corresponds with target device 212, a service code or option that indicates a presence of supplementary data, a portion of which is usable to determine a text message that is to be presented on receiving device 212 before a call is answered between calling device 214 and target device 212.

Figure 3A:
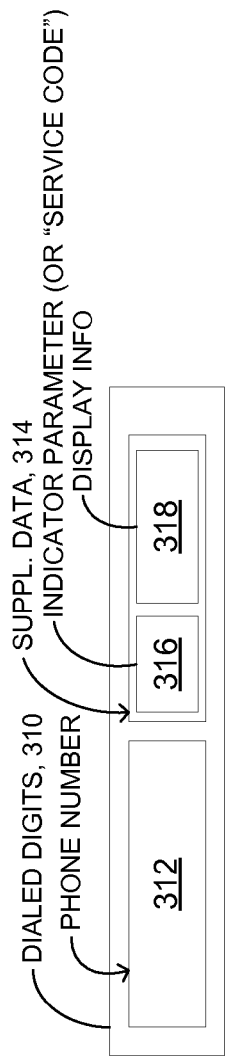
FIGS. 3A-3C depict illustrative aspects of a format of dialed digits that can be dialed in accordance with various embodiments of the present invention.
Figure 3B:
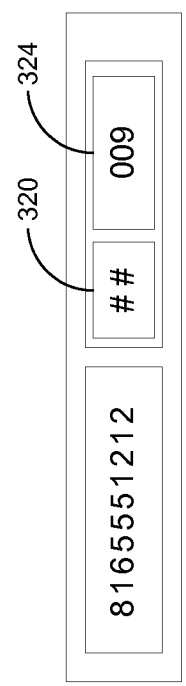
Figure 3C:
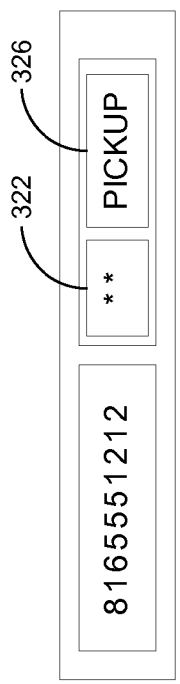

Turning briefly to FIG. 3, for a better understanding of aspects associated with the content of dialed digits 226, an illustrative set of dialed digits 310 is shown to include a phone number 312 associated with target device 212, and supplementary data 314, which includes a parameter 316 that indicates a presence of supplementary data 314 and/or display information 318, which is usable to determine an ultimate text message, and can even be the actual text message to be presented on receiving device 212 before it is answered. The order of the information might vary. The indicator parameter 316 is variously referred to herein as a "service code," which is not meant to be used as a term of art; rather, it is used herein to refer to any sequence of characters that a switch or receiving device processes to know that display information 318 is present. By way of example, service code 316 might take the form of "##", which is indicated by reference numeral 320 in FIG. 3B. In another embodiment, service code 316 might take the form of "" as shown by reference numeral 322 in FIG. 3C. Service code 316 can be any sequence of characters, not just those shown. Sometimes, what are referred to as "# codes" are used by devices such as telecommunications switch 221 to convey certain information. Here, an application 228 on switch 221 would determine the presence of service code 316, and thereby be aware of supplementary data 314, including display information 318**.

As mentioned, display information 318 can take the form of a code that is usable to determine an actual text message to be displayed on target device 212 or it can take the form of an actual text message itself. By way of example, reference numeral 324 in FIG. 3B indicates an exemplary code that is usable by an intermediate or end device to determine an actual text message to be displayed prior to a person entering a telephone call. For example, perhaps "009" is a string in a database associated with switch 221 or receiving device 212 that is searchable to determine a text message that corresponds to the code 324. An illustrative database includes database 230 in FIG. 2, which might even include a user specific code list 232 that is populated with user-defined codes. In such an embodiment, a user of calling device 214 could log onto a website for example or utilize mobile device 214 to configure a set of codes that, when encountered by switch 221 cause it to retrieve a corresponding text message from database 230, which might be a part of or coupled to switch 221. In other embodiments, display information 318 is an actual text message, such as that referenced by numeral 326 of FIG. 3C, which is illustratively shown to be "pickup." In this example, dialed digits 310 include the phrase "pickup" such that while receiving device 212 is still ringing, the phrase "pickup" will be presented either alone or at the same time as other information, such as caller ID information.

Returning to FIG. 2, switch 221 communicates display information 234 to receiving device 212, which utilizes it to present a presentation 236 on its display, which presentation is illustratively shown in FIG. 2 to include caller ID information 238 as well as a text message 240 prior to and answering of target device 212. Text message 240 illustratively shown in FIG. 2 is "I miss you." This message would be presented on target device 212 before a user answers a call initiated by calling device 214. Thus, while a user is in a board meeting, he might receive a call from his wife along with the accompanied text message 240 "I miss you" and thus decide not to excuse himself from the meeting, knowing that the nature of the call is likely not an emergency. In another implementation, the message on target device may only displayed if user misses the call or chooses to ignore the call.

Further, our technology contemplates being able to not only indicate that the call should be ignored, but providing optional feedback that can be relayed to calling device 214. For example, an ignore option 242 might be presented by way of a soft key for the user of target device 212 to utilize. In one embodiment, selecting the ignore option 242 is registered as affirmative feedback as opposed to a lack of interaction by a user that led to the call being forwarded to voicemail or terminated by calling device 214. Switch 221 knows when a user affirmatively acted to ignore a call; that is, it was not cut off because of excessive rings for example. Thus, switch 221 can then communicate a custom or predetermined message that the call was denied by the user.

Thus, utilizing the ignore option 242 is one way to cause feedback 244 to be conveyed to the caller. Information is communicated to switch 221 and passed along either in its current or a modified form 246 to calling device 214. Switch 221 is made aware of the fact that a user affirmatively ignored the call, and is equipped with an ability to notify calling device 214 by way of message 246. Message 246 might be a simple "message received" type of confirmation that is presented by way of a presentation 248, which can include an actual feedback message 250.

Feedback message 250 can even be simpler, such as a particular LED being triggered or abbreviated symbol being conveyed. In this way, calling device 214 indicates that the call was affirmatively ignored. In situations where a caller is just calling to say hello or for no particular reason, this can be desirable inasmuch as the calling party knows that the intended recipient received at least the message 240 attempted to be conveyed. This can be achieved by extending the "Call Release request", which originates from the target device when user "ignores" the call or by extending the "Call release request" originated from switch when the target device does not respond after a number of rings.

But in other embodiments, a more sophisticated feedback provision can be accomplished. For example, instead of merely selecting an ignore option, a user might respond with a selection from a different option 251. In some embodiments, what is referenced as numeral 251 is a label that maps to a key press. In other embodiments, it is selectable in and of itself so as to provide a mechanism to receive an indication of a desired feedback option. Three illustrative feedback options 252 are shown. These illustrative examples include a first option 254, a second option 256, and a third option 258. Illustrative first option 254 maps a numerical "1" to the phrase 260 "will do," such that this phrase will appear as text message 250 on calling device 214. In this way, when a user of device 212 receives an incoming call that includes a presentation of a text message such as text message 240, and then presses the "1" key while the phone is ringing, then, even before the call is completely torn down, in some embodiments the message "will do" will be presented on calling device 214. This can be achieved by extending the "Call release request" message. In some embodiments, local list 222 is used to determine the phrase 260 "will do," and that is communicated as part of the feedback response 244. In other embodiments, the code itself, such as "1," is communicated as part of feedback 244 to switch 221. In this case, switch 221 might determine the corresponding feedback message that maps to "1," or the code might be passed on to calling device 214, in which case application 218 would determine the appropriate text message to display based on having to receive code 254. A code similar to service code 316 of FIG. 3A can be provided to indicate whether that which is communicated 254 is a code or text itself that should be displayed. This is also the case with the original display info 318 that is communicated to receiving device 212. For example, perhaps a "##" 320 indicates that display info 318 is a code 324, whereas a code 322 of "**" indicates that display info 318 is actual text 326 that should be displayed.

Returning to some more illustrative examples of responding to an incoming call, a second option 256 indicates that if a user of target device 212 responds to a ringing telephone by selecting the numerical "2" value, then the message 262 "can't right now" is communicated to calling device 214, which is received even while the user of phone 214 is hearing ring tones associated with the attempted call. A third example 258 includes the "wait 5 minutes" text 264.

In still other embodiments, feedback message 244 is provided contemporaneously with call teardown. In such an embodiment, when a user device 212 is ringing, and receives feedback from a user, then this feedback 244 triggers that the call should be torn down such that when switch 221 receives the information it sends it to calling device 214 along with a call-termination command.

Figure 4:
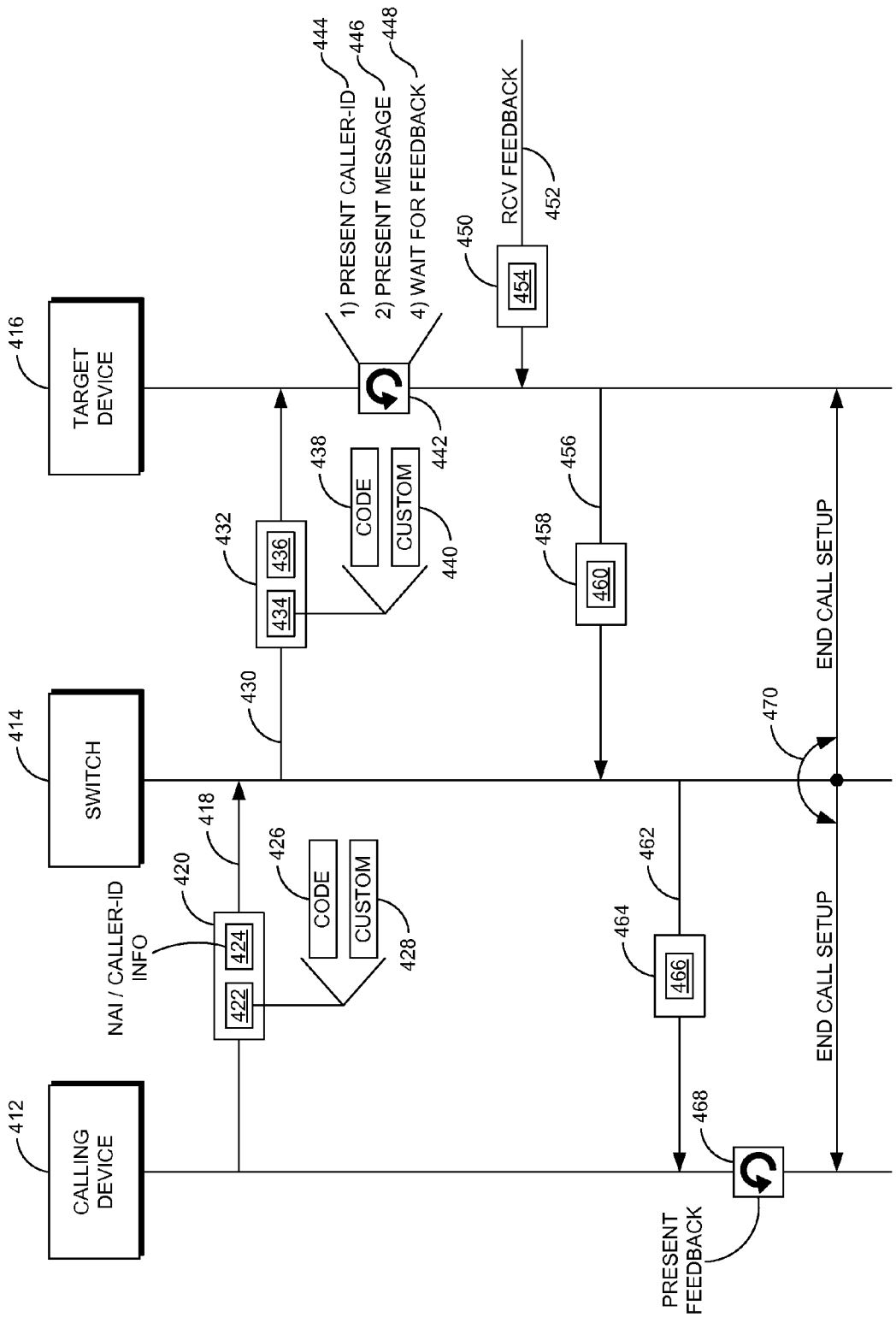
FIG. 4 depicts an illustrative data flow that shows data flowing in accordance with an embodiment of the present invention between a calling device and a target device.

Turning now to FIG. 4, another illustrative flow diagram is provided regarding a calling device 412, a telecommunications switch 414 and a target device 416. In one embodiment, at a step 418, a set of dial digits 420 is communicated from calling device 412 to switch 414. The dial digits can include supplementary data 422, which can be made up of a code 426 and/or custom text or even a custom code 428. In some embodiments, an identifier 424 is provided that identifies calling device 412. Illustrative information usable to identify calling device 412 includes a network address identifier or other information that indicates a telephone number associated with calling device 412. But supplementary information 422 is not part of any caller ID or other information 424.

At a step 430, the information 432 is communicated to target device 416 from switch 414. Information 432 may be the same as or derived from information 420. For example, it might include the same or a different code 438, as well as custom text 440. Information 432 can also include caller ID or geographic-location information 436, which is separate from supplementary data 434.

At a step 442, target device 416 presents any caller-ID information 444 if applicable, and will also present 446 an appropriate text message based on the information 432 provided, and also wait 448 for any feedback that might be received from a user of target device 416. When feedback 450 is received at a step 452, it, or information 454 derived from it, is communicated to switch 414 at a step 456. In some embodiments, target device 416 derives information 458 from the original feedback 450. In other embodiments, information 458 is the same as that of 450. Information 458 can include more than information 460 that is usable to ultimately present feedback on calling device 412.

At a step 462, information 464, which includes information 466 that is usable to present the text message, is communicated to calling device 412, which presents the applicable feedback at a step 468. Call setup can be ended at a step 470 after the feedback is presented in one embodiment of the present invention.

Figure 5:
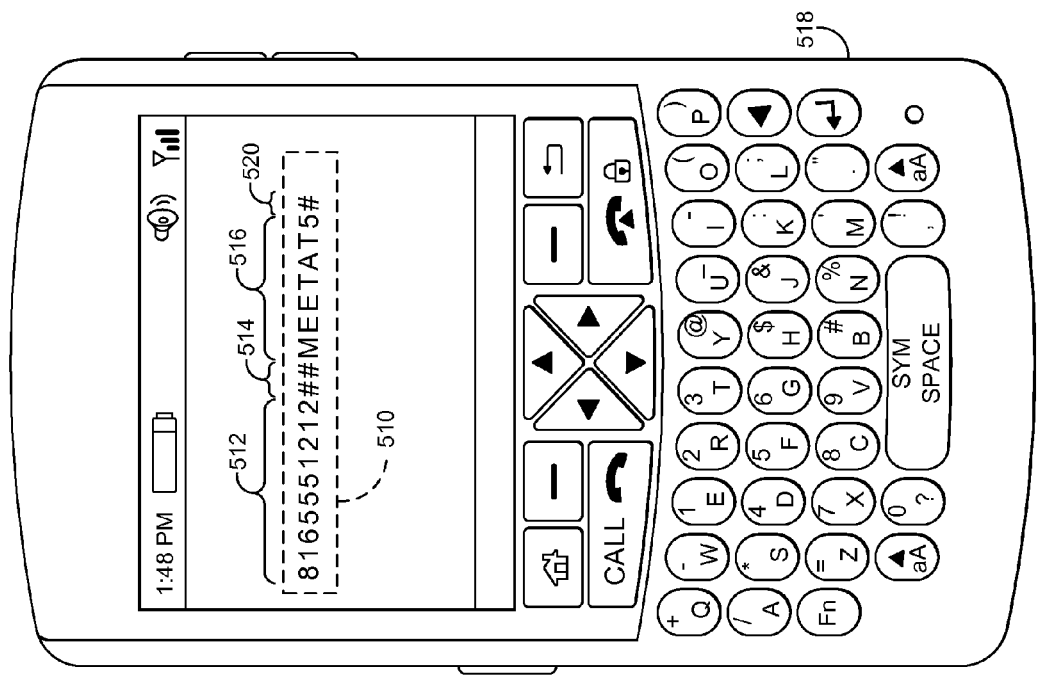
FIG. 5 depicts an illustrative set of dialed digits that are presented on a screen of an illustrative calling device in accordance with an embodiment of the present invention.

Turning now to FIG. 5, an illustrative representation of a set of dialed digits 510 is provided. In the example shown, the set of dialed digits includes a phone number 512, as well as a parameter 514 (variously referred to as a service code), and a text message 516 that is to be presented on a target device that will be called by calling device 518. In some embodiments, a closing parameter 520 can be provided to indicate a close of dialed digits 510. The actual variations of streams such as demarcation parameter 514 or ending parameter 520 are legion (?). They may take on a variety of forms. And, as mentioned, what is shown as actual text 516 might be a code that is interpreted either by the calling device, a switch, or even a target device that receives display information associated with the dialed digits 510. We merely provide an example to help convey an aspect of the present invention.

Figure 6:
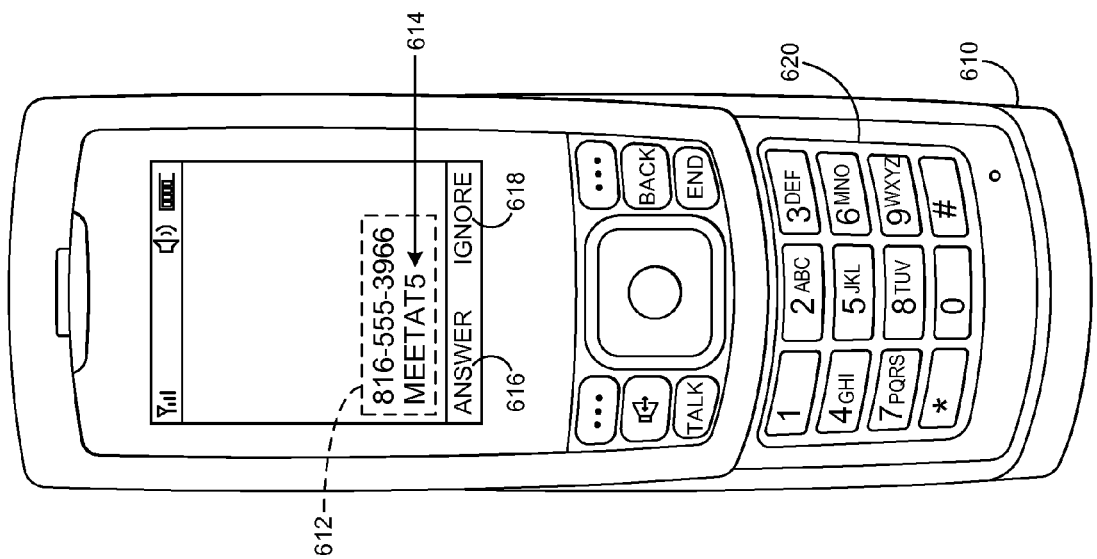
FIG. 6 depicts an illustrative message received at a target device in accordance with an embodiment of the present invention.

Similarly, FIG. 6 depicts an illustrative receiving device for target device 610, which includes a presentation 612, which includes an illustrative text message 614 that is presented on target device 610 while target device 610 is still in a call-notification state. Thus, before a user even answers a call that is received by target device 610, the user is made aware of a corresponding text message associated with the call, thereby allowing him or her to respond or receive information without even picking up the phone, but at the same time enabling the user to answer the phone if desired. Thus, an option to answer 616 the call or to ignore 618 the call is provided. Similarly, any of the keys on the keypad can be utilized to respond to the call. In one embodiment, target device 610 includes an application (such as application 266 of FIG. 2) that interprets a digit received during a call sequence as an intended feedback option such that when a key is pressed while the phone is ringing, a desired feedback message is ultimately provided to calling device 214 based on the key entered.

Figure 7:
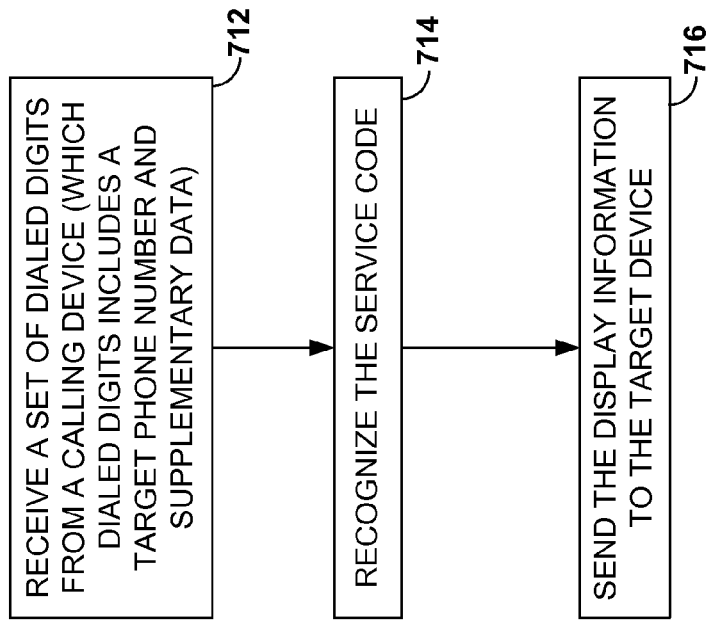
FIGS. 7-9 depict illustrative methods of enabling a user to receive a message at the time of an incoming call in accordance with various embodiments of the present invention.

Turning now to FIG. 7, an illustrative method for enabling a user to receive a message at the time of an incoming call is provided. At a step 712, a set of dialed digits is received from a calling device. The dialed digits include a phone number of the target device and supplementary data that include display information that is usable to facilitate presenting a text message on the target device. The supplementary data includes a service code (which might be known by different names to those of ordinary skill in the art) that indicates a presence of the supplementary data. As we have previously described, the service code or indicator parameter is a code that indicates a presence of, or sometimes forms a portion of, supplementary data such as supplementary data 314. This supplementary data is supplemental in the respect that it includes additional information beyond just the telephone number of a target device such as target device 212.

At a step 714, the service code is recognized. In one embodiment, application 228 of switch 221 recognizes the presence of the service code. In other embodiments, another device might recognize a presence of the service code. In some cases, application 218 of calling device 214 recognizes the service code, as might also target device 212 itself via application 266.

At a step 716, a call-connection process is continued such that the display information is sent to the target device. We have shown illustrative display information as referenced by numeral 318 in FIG. 3A as well as by reference numeral 516 of FIG. 5. This display information is usable to present a message on the target device prior to the target device answering the call. An example of presenting such a message is seen in FIG. 6 by way of message 614.

In some embodiments the display information is itself a text-based message to be presented on the target device. An example of this is shown in connection with FIGS. 5 and 6 in which "meet at 5" 516 is the message itself 614 to be displayed. In other embodiments, the text-based message is determined in a lookup or similar fashion by referencing a database stored in the target device. An illustrative database might take the form of list 222, which is referenced in connection with application 266 processing a service code in some embodiments.

In some embodiments, the supplementary data does not include caller-ID information nor geographic-location information of the calling device. That is, we are describing additional information than that which has been provided in the prior art, if applicable. Although caller-ID information has been sent to a target device such as target device 212, the display information that we are describing that is sent to target device 212 is different from, and in some cases in addition to, caller-ID information and/or geographic-location information of the calling device, which sometimes indicates a location from which the call-initiating device 214 is associated.

As mentioned, switch 221 might either look up actual text based on the service code and send the actual text to target device 212 or it might send the display information in an unaltered form to target device 212. In the latter case, target device 212 could either present the unaltered display information or use it to determine an applicable text message as mentioned.

Figure 8:
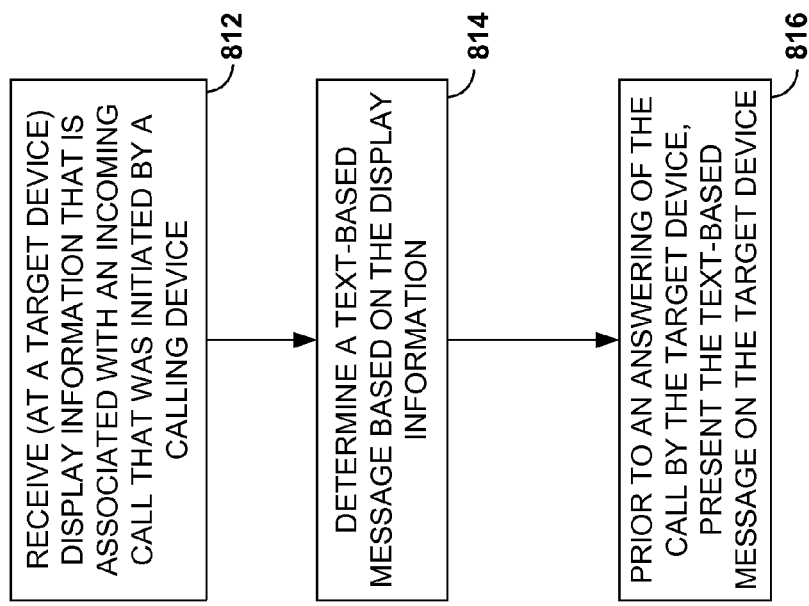

Turning now to FIG. 8, an illustrative method of enabling a user to receive at a target device a message at the time of an incoming call is provided. At a step 812, display information is received at a target device, such as target device 212. The display information is associated with an incoming call that was initiated by a calling device such as calling device 214. The display information is usable to determine a text-based message that will ultimately be displayed on target device 212 (or, for example, target device 610). The text-based message is not part of any caller-ID information nor geographic-location information that describes a location of the calling device (such as by determining an area code associated with a phone number of the call-originating device).

At a step 814, a text-based message is determined based on the display information. In one embodiment, determining the display information is carried out by application 266 on target device 212; in other cases, application 228 of switch 221 facilitates determining the text-based message to be displayed. In the case where target device 212 is used to determine the text-based message, a database such as list 222 can be referenced to match a code 316 that is received by target device 212. List 222 associates the display information with text-based information in some embodiments.

At a step 816, the text-based message is presented on the target device prior to an answering of the call by the target device. Thus, while the phone is ringing, vibrating, or otherwise conveying the presence of an incoming call, the text-based message is presented before the call is answered.

In some embodiments, the method further includes determining that the call should be ignored. This can be accomplished by receiving user input that indicates that the call should be ignored. In one embodiment, user input is received at the target device, which is communicated to switch 221. Thus, the determination to ignore a call can be made by the target device and/or switch 221.

In some embodiments, the user input includes feedback information that is to be communicated to the calling device still without the call ever having been answered. The feedback information can take the form of actual feedback text that is to be presented on the calling device or it might take the form of a feedback code that is usable to determine presentation text that is to be presented on the calling device. In this way, the feedback code could be usable by the target device, switch 221, or the calling device. In each of these examples, an application such as application 266, 228, or 218 can receive the feedback code and process it accordingly, which might include looking up presentation text or communicating the text as is.

Figure 9:
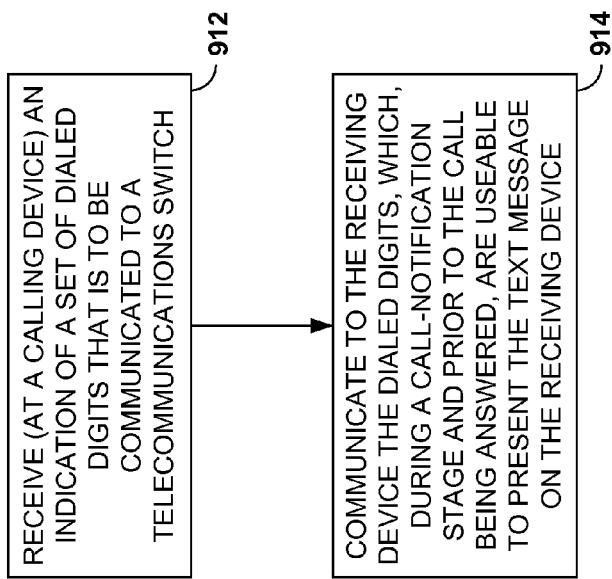

Turning now to FIG. 9, another illustrative method of enabling a user to receive a message at the time of an incoming call is provided. At a step 912, a calling device receives an indication of a set of dialed digits that is to be communicated to a telecommunications switch. An illustrative set of dialed digits is depicted in FIG. 5 by numeral 510. The dialed digits include a phone number 512 as well as supplementary data, which can be one or more of those items indicated by numerals 514, 516, and/or 520. The supplementary data includes display information that is usable by a target device to present a text message in some embodiments.

At a step 914, the dialed digits are communicated to the receiving device. The dialed digits are usable to present a text message on the receiving device during a call-notification stage and prior to the call being answered. Thus, as the sender is listening to ringtones, a desired message that he or she wanted to communicate is being presented on the target device, thereby enabling a user to make an informed decision as to whether to answer the phone call or not.

In other embodiments, the text message is not presented while ringing, but is presented as an alternative to the call originator being routed to voicemail.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method of enabling a user to receive a message at the time of an incoming call, the method comprising:
   receiving a set of dialed digits from a calling device, wherein the dialed digits include,
   (1) a phone number of a target device,
   (2) supplementary data that includes display information that is useable to facilitate presenting a text message on the target device, wherein the display information takes the form of one or more of the following: actual text to be displayed on the target device or presentation code that is useable to determine text to be displayed on the target device,
   (3) wherein the supplementary data includes a service code that indicates a presence of the supplementary data;
   recognizing the service code;
   continuing a call-connection sequence that, if completed, would establish a call between the calling device and the target device,
   (1) wherein the continuing includes either looking up the actual text based on the service code and sending the actual text to the target device or sending the display information unaltered to the target device, and
   (2) wherein the target device could either present the unaltered display information or use the display information to determine an applicable text message to display prior to the target device answering the call.

2. The non-transitory computer-readable media of claim 1, wherein the service code is made up of one or more characters that, when encountered, indicate the presence of the supplementary data.

3. The non-transitory computer-readable media of claim 1, wherein the supplementary data does not include caller-ID information nor geographic-location information of the calling device.

4. The non-transitory computer-readable media of claim 1, wherein the service code indicates whether the display information is the actual text verses the presentation code.

5. The non-transitory computer-readable media of claim 1, wherein recognizing the service code is accomplished by a telecommunications switch.

6. The non-transitory computer-readable media of claim 5, wherein the calling device is a mobile phone that communicates data by way of a wireless telecommunications network.

7. Non-transitory computer-readable media having computer-executable instructions embodied thereon that, when executed, facilitate a method of enabling a user to receive at a target device a message at the time of an incoming call, the method comprising:
   at the target device, receiving ring tones and display information associated with the incoming call, which was initiated by a calling device,
   (1) wherein the display information takes the form of one or more of the following: actual text to be displayed on the target device or presentation code that is useable to determine text to be displayed on the target device, and
   (2) wherein the display information is not part of any caller-id information nor geographical-location information associated with a calling device that initiated the call; and
   prior to an answering of the call by the target device, presenting on the target device the unaltered display information if the display information takes the form of the actual text or otherwise using the display information to determine an applicable text message to display.

8. The non-transitory computer-readable media of claim 7, wherein using the presentation code to determine an applicable text message to display includes referencing a database stored in the target device, wherein the database associates the display information with the applicable text message.

9. The non-transitory computer-readable media of claim 7, further comprising determining that the call should be ignored.

10. The non-transitory computer-readable media of claim 9, wherein determining that the call should be ignored includes receiving user input that indicates that the call should be ignored.

11. The non-transitory computer-readable media of claim 10, wherein the user input includes feedback information that is to be communicated to the calling device without the call ever having been answered.

12. The non-transitory computer-readable media of claim 11, wherein the feedback information takes the form of one of the following:
   actual feedback text that is to be presented on the calling device, or
   a feedback code that is useable to determine presentation text that is to be presented on the calling device.

13. The non-transitory computer-readable media of claim 12, wherein the feedback code is useable by one or more of the following:

the target device;
a telecommunications switch; and
the calling device.

14. Non-transitory computer-readable media having computer-executable instructions embodied thereon that, when executed, facilitate a method of enabling a user to receive a message at the time of an incoming call, the method comprising:
- at a calling device, receiving an indication of a set of dialed digits that are to be communicated to a telecommunications switch,
  - (1) wherein the dialed digits include a phone number and supplementary data,
  - (2) wherein the supplementary data includes display information that is useable by a target device to present a text message, wherein the display information takes the form of one or more of the following: actual text to be displayed on the target device or presentation code that is useable to determine text to be displayed on the target device;
- initiating a call to the target device, wherein the initiating includes communicating the dialed digits to the receiving device, which, during a call-notification stage and prior to the call being answered, are useable to present unaltered display information on the target device if the display information takes the form of the actual text or otherwise use the display information to determine an applicable text message to display on the target device.

15. The non-transitory computer-readable media of claim 14, wherein receiving the indication includes receiving the indication by way of user input.

16. The non-transitory computer-readable media of claim 14, further comprising receiving feedback information that was communicated from the target device, wherein the feedback information is received at the calling device and is useable to present a feedback message on the calling device prior to the call ever being answered.

17. The non-transitory computer-readable media of claim 16, wherein the feedback information takes the form of a feedback code that is useable to present the feedback message.

* * * * *